(No Model.) 2 Sheets—Sheet 1.

J. M. ORR.
COMBINED COTTON SEED PLANTER AND FERTILIZER DISTRIBUTER.

No. 446,978. Patented Feb. 24, 1891.

Witnesses
Geo. E. Frech,
Wm. Bagger

Inventor
James M. Orr
By his Attorneys,
C. A. Snow & Co.

(No Model.) 2 Sheets—Sheet 2.
J. M. ORR.
COMBINED COTTON SEED PLANTER AND FERTILIZER DISTRIBUTER.
No. 446,978. Patented Feb. 24, 1891.
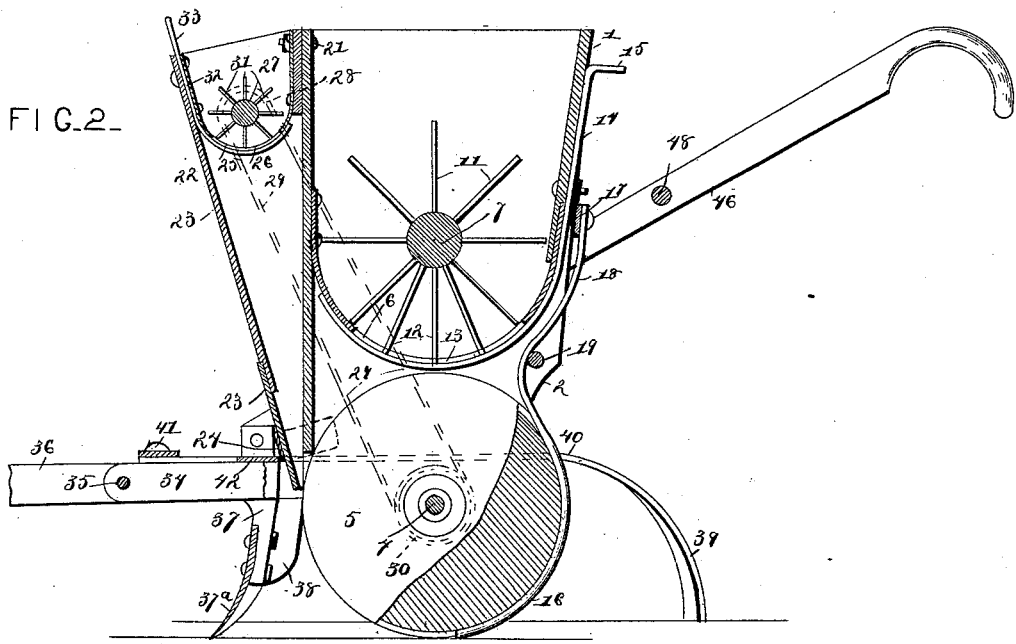
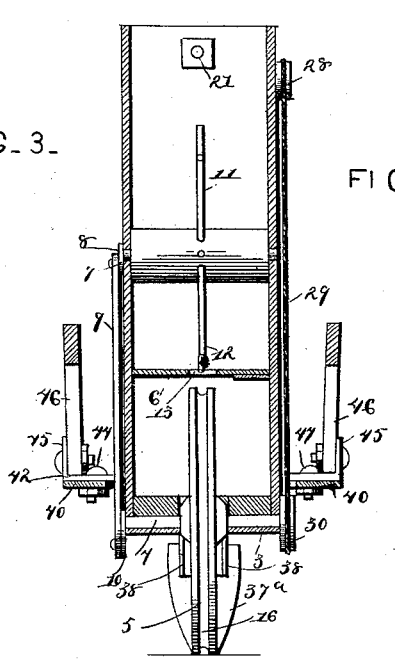
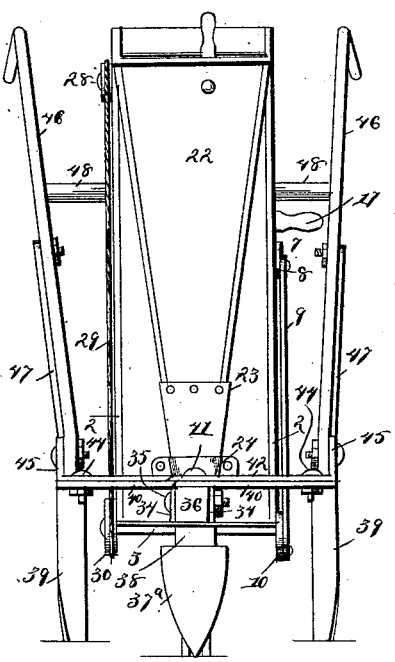
Witnesses
Geo. E. Fuch.
Wm. Bagger.
Inventor
James M. Orr.
By his Attorneys,
C. A. Snow & Co.

UNITED STATES PATENT OFFICE.

JAMES M. ORR, OF EAST POINT, GEORGIA.

COMBINED COTTON-SEED PLANTER AND FERTILIZER-DISTRIBUTER.

SPECIFICATION forming part of Letters Patent No. 446,978, dated February 24, 1891.

Application filed October 29, 1890. Serial No. 369,683. (No model.)

*To all whom it may concern:*

Be it known that I, JAMES M. ORR, a citizen of the United States, residing at East Point, in the county of Fulton and State of Georgia, have invented a new and useful Combined Cotton-Seed Planter and Fertilizer-Distributer, of which the following is a specification.

This invention relates to a combined cotton-seed planter and fertilizer-distributer; and it has for its object to construct a device of this class which shall be simple, durable, and easily manipulated, and by means of which the seeds shall be pressed or packed compactly into the furrow formed in the ground for their reception, so as to insure their speedy and successful germination.

The invention consists in the improved construction, arrangement, and combination of parts, which will be hereinafter fully described, and particularly pointed out in the claims.

Figure 1:
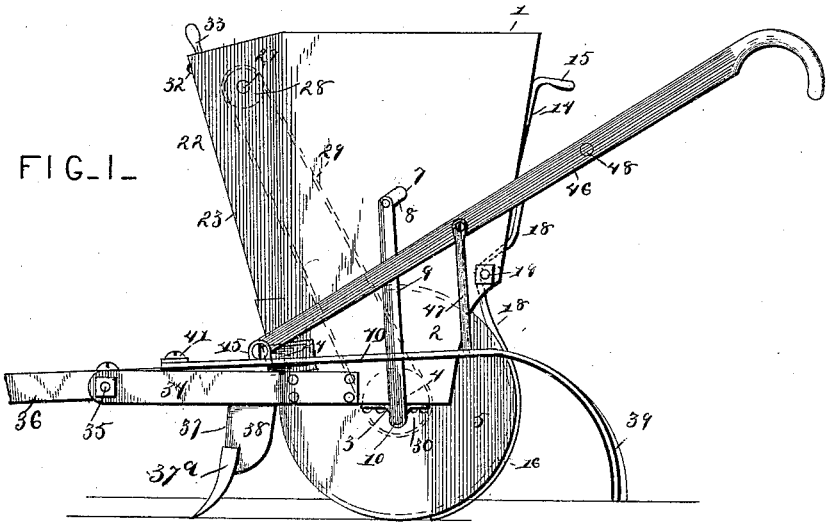
Figure 4:
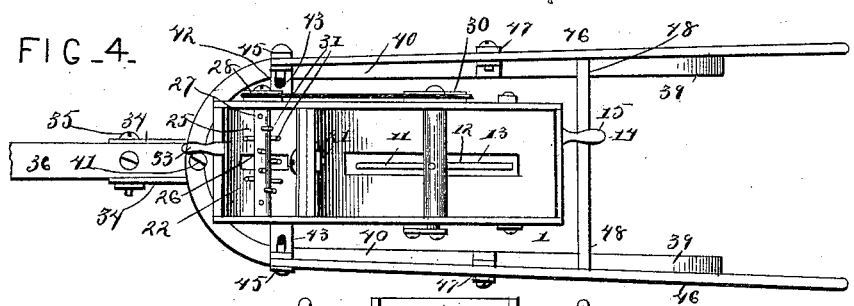
Figure 6:
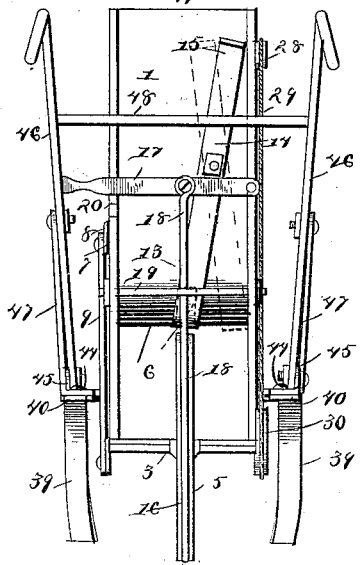

In the drawings hereto annexed, Figure 1 is a side elevation of a machine constructed in accordance with my invention. Fig. 2 is a longitudinal vertical sectional view of the same. Fig. 3 is a vertical transverse sectional view. Fig. 4 is a top view. Fig. 5 is a rear elevation. Fig. 6 is a front view.

Like numerals of reference indicate like parts in all the figures.

1 designates the main box or hopper, which is provided with downwardly-extending flanges 2 2, at the lower ends of which boxes or bearings 3 are provided for the transverse shaft or axle 4, upon which the transporting-wheel 5 is mounted, said wheel extending upwardly between the flanges 2 and terminating directly under the curved bottom 6 of the hopper. The latter is provided with bearings for transverse rock-shafts 7, one end of which has a crank 8 connected by a pitman 9 with a crank 10 on one end of the axle 4. The rock-shaft 7 has a series of radially-extending fingers 11, forming stirrers or agitators, and is also provided with arms 12, which may project slightly through a slot 13, formed in the bottom of the hopper, for the purpose of forcing the seed contained in the hopper out through the said slot. A regulating-slide 14 is pivotally mounted upon the rear side of the hopper, and is provided at its upper end with a handle 15, the lower end of said regulating-slide being curved under the bottom 6, so that it may be readily adjusted to regulate the width of the slot 13, and thus gage the quantity of seeds which shall be permitted to escape through the said slot.

The transporting-wheel 5 is provided with a peripheral groove 16, adapted to receive the seed as it passes through the slot 13 and to convey it to the furrow, in which the seed is pressed or packed by the said wheel, as will be presently more fully described.

To the rear side of the hopper is pivoted a lever 17, with which is pivotally connected a curved elastic rod 18, the lower end of which rests in the peripheral groove 16 of the transporting-wheel. The elastic rod 18 is curved under a bolt 19, which connects the flanges 2 of the hopper, and it is held by the said rod in contact with the groove of the transporting-wheel. The free end of the lever 17 is adjustable in any one of a series of notches 20, and it will be seen that by raising or lowering the said lever the bolt 19 may be caused to press the elastic rod 18 into contact with the transporting-wheel with any desired degree of tension. This elastic rod is for the purpose of keeping the groove 16 clean and free from obstructions. It will be seen that the said rod terminates almost directly below the axle 4, and it will thus also serve to remove any seeds which might have a tendency to adhere in the groove 16, thus causing the seed to be planted evenly and regularly.

Suitably mounted upon the front side of the hopper 1, by means of a bolt 21, is a supplemental hopper 22, having a downwardly-extending spout 23, which terminates directly in front of the wheel 5, the lower end of said spout being secured to the front side of the hopper by means of a transverse strap or clip 24. The hopper 22, which is provided with a curved bottom 25, having a slot 26, is provided with bearings for a transverse shaft 27, one end of which has a band-wheel, pulley, or sprocket-wheel 28, which is connected by means of a band or chain 29 with a similar wheel 30 on one end of the axle 4 of the transporting-wheel, from which latter motion is thus transmitted to shaft 27. The latter is provided with spirally-arranged fingers 31, serving to force the contents of the hopper in the direction of the slot 26, through which it may escape. A regulating-slide 32, having a handle 33, is pivoted to the front wall of the hopper 22 for the purpose of regulating the quantity of fertilizing material which shall be permitted to escape through the slots 26.

The lower ends of the flanges 2 of the main hopper are provided with forwardly-extending straps 34, the front ends of which are pivotally connected by means of a transverse bolt 35 to opposite sides of the beam 36. The latter is provided at its rear end with a downwardly-extending shank or standard 37, to the lower end of which the furrow-opener 37ª is to be attached. The standard 37 is provided with rearwardly-extending flanges 38, serving as the seed-spout to guard the seeds from the wind and to convey them to the furrow.

39 39 designate the coverers, which consist of suitably-shaped leaves curved downwardly from the side bars 40, the front ends of which are curved inwardly and connected to the beam 36, near the rear end of the latter, by a pivotal bolt 41. Suitably secured to the rear end of the beam 36 is a transverse strap 42, having slot 43, to which the side bars 40 are adjustably connected by means of bolts 44. The outer ends of the strap 42 are provided with upturned lugs 45, to which the lower ends of the handles 46 are secured. The said handles are also connected with the bars 40 by means of braces 47, and a rung 48 connects the said handles in rear of the hopper 1.

From the foregoing description, taken in connection with the drawings hereto annexed, the operation and advantages of my invention will be readily understood by those skilled in the art to which it appertains. The cotton-seed which is to be planted is placed in the hopper 1 and fertilizing material of any suitable kind in the hopper 22. As the machine progresses over the field the furrow-opener 37ª, attached to the standard 37, will form a furrow in advance of the transporting-wheel 5. The latter by contact with the ground is caused to revolve, transmitting motion through the pitman 9 to the rock-shaft 7, the arms 12 of which will expel the cotton-seed through the slot 13, the seed dropping into the peripheral groove 16 of the wheel 5. At the same time motion is transmitted by the band or chain 29 from the axle 4 to the revolving shaft 27 in the hopper 22, causing fertilizing material to be dropped through the spout 23 and directly upon the periphery of the wheel 5, where it becomes mixed with the cotton-seed. As the wheel revolves, the cotton-seed and fertilizing material are carried into the furrow, where they are firmly pressed or packed by the said wheel. The elastic rod 18 serves to clean the groove of the latter, and the seed is eventually covered by the blades 39. The latter may be adjusted laterally, as hereinbefore described. It will be observed that the straps 34, carrying the hopper and all its attachments, are connected pivotally to the beam. It follows that the transporting-wheel will readily adapt itself to any inequalities in the soil, riding easily over hillocks, roots, stones, and other obstructions. The general construction of my improved machine is simple and inexpensive, and it will be found durable and efficient in operation.

Having thus described my invention, I claim—

1. In a machine of the class described, the combination of the hopper having downwardly-extending flanges, the transverse shaft or axle mounted in bearings at the lower end of said flanges and having an annularly-grooved transporting-wheel accommodated between the latter, a rock-shaft mounted in the hopper and having radial arms and agitators, and a pitman connecting the crank upon said shafts to the crank at one end of the axle, substantially as set forth.

2. In a machine of the class described, the combination of the hopper having a curved slotted bottom and provided with downwardly-extending flanges, the shaft journaled at the lower ends of said flanges, the annularly-grooved transporting-wheel mounted upon said shaft, a lever pivoted to the rear side of the hopper, and an elastic rod pivoted to said lever and having a downwardly-extending curved end resting in the groove of the transporting-wheel and extending forwardly nearly under the axle of the latter, substantially as set forth.

3. In a machine of the class described, the combination of the hopper having downwardly-extending flanges, the axle journaled at the lower ends of the said flanges, the transporting-wheel having a peripheral groove, a lever pivoted to the rear side of the hopper and having its free end mounted adjustably in one of a series of notches, and a curved elastic rod pivoted to said lever and having its free end mounted in the peripheral groove of the transporting-wheel, substantially as and for the purpose set forth.

4. In a machine of the class described, the combination of the hopper having downwardly-extending flanges, the axle journaled at the lower ends of said flanges, the transporting-wheel having a peripheral groove, a lever pivoted to the rear side of the hopper and having its free end mounted adjustably in one of a series of notches, a curved elastic rod pivoted to said lever and having its free end mounted in the peripheral groove of the transporting-wheel, and a bolt connecting the flanges, extending downwardly from the hopper, and fitted in a forwardly-curved portion of the said elastic rod, substantially as and for the purpose set forth.

5. In a machine of the class described, the combination of the hopper having downwardly-extending flanges, the axles journaled at the lower ends of said flanges and carrying the transporting-wheel, the supplemental hopper mounted upon the front side of the main hopper and having a revolving feed-shaft provided with spirally-arranged fingers, a rock-shaft mounted in the main hopper and having radial feed-arms and agitators, means, substantially as described, for transmitting motion from the transporting-wheel to the feed mechanism in both hoppers, the beam having a furrow-opener, coverers, and handles, and straps extending forwardly from the flanges of the main hopper and connected with said beam by a single transverse pivotal bolt, substantially as and for the purpose set forth.

6. In a machine of the class described, the combination of the beam, the hopper having forwardly-extending straps connected pivotally with said beam, the shank or standard mounted upon the latter and having rearwardly-extending flanges fitted between the straps extending forwardly from the hopper, and the coverers connected pivotally to the beam by means of a single vertical bolt and connected adjustably with a transverse strap mounted upon the rear end of the beam, substantially as and for the purpose set forth.

7. The combination of the beam, the standards having the furrow-opener and provided with rearwardly-extending flanges, the transverse strap secured upon the rear end of the beam and having upwardly-extending lugs, the furrow-openers connected pivotally with the other side of the beam and having bolts connected adjustably with the transverse strap upon the latter, the handles having their lower ends connected with the upturned lugs of said strap and connected by suitable braces with the coverers, and the hopper having the transporting-wheel and seeding mechanism, said hopper being provided with forwardly-extending straps connected pivotally with the beam by means of a transverse bolt, substantially as and for the purpose set forth.

In testimony that I claim the foregoing as my own I have hereto affixed my signature in presence of two witnesses.

J. M. ORR.

Witnesses:
JAMES MAYSON,
A. B. HARRISON.